April 28, 1970     E. C. KLEBE, JR     3,508,291

CORD EXIT DEVICE

Filed March 25, 1968

Witness

Rosalind Tsai

INVENTOR.
Elmer C. Klebe Jr.
BY
Marshall J. Breen
ATTORNEY

United States Patent Office 3,508,291
Patented Apr. 28, 1970

3,508,291
CORD EXIT DEVICE
Elmer C. Klebe, Jr., Anderson, S.C., assignor to The Singer Company, New York, N.Y., a corporation of New Jersey
Filed Mar. 25, 1968, Ser. No. 715,903
Int. Cl. A47l 9/26
U.S. Cl. 15—323            5 Claims

ABSTRACT OF THE DISCLOSURE

A device adapted to be mounted in a recessed housing for guiding a cord from a cord retractor and for preventing complete retraction of the cord therethrough when it is rewound on the cord retractor.

SUMMARY

This invention relates to the art of electrically operated appliances, such as vacuum cleaners, provided with a cord reel or retractor for rewinding the power cord, and more particularly to a novel and improved guiding and limiting device adapted for mounting in a recessed housing, whereby complete retraction of the plug end of the cord is prevented while assembly and replacement of the device is facilitated by virtue of its design.

The present invention comprises a hollow partly flexible molded cord exit device which is partially split in at least one of its two sides so that the device may be expanded for passage of the plug end of the power cord therethrough. The cord exit is provided at one end with a rim defining a relatively wide-mouthed opening for receiving a cord plug therein and at the other end with a relatively small expandable opening for preventing withdrawal of the plug end therethrough when the cord exit is mounted to the housing. The rim effectively divides the cord exit into two halves by means of a pair of flexible portions formed on the rim adjacent one end of the splits formed in the side walls of the cord exit which are thin relative to the remainder of the rim. This arrangement allows the split halves of the cord exit to be flexed about a substantially central axis common to the flexible portions, thereby expanding at least one of the cord exit openings for facilitating assembly of the cord exit to the power cord after attachment thereof to the cord reel mechanism or when it is desired to replace the cord exit in the case of wear. A pair of lateral mounting projections integrally formed on the cord exit are provided with mounting slots for receiving fastening screws therein which secure the cord exit to the housing in a substantially closed or non-expanded position. Because of its capacity to expand, the present invention is superior to prior art cord exit devices which have to be pre-assembled to the power cord prior to its assembly to the cord reel. Also, the expansion capacity of the presently disclosed cord exit makes replacement thereof a simple task, since it is not necessary to disassemble the power cord from the cord reel mechanism as is true in the case of prior art cord exits.

Accordingly, a principal object of this invention is to provide an improved type of cord exit device.

Another object of this invention is to provide a hollow expandable cord exit device adapted in one position to freely pass over the plug end of a power cord and in a second position to prevent retraction of the plug end therethrough.

A further object of the present invention is to provide a cord exit which can be assembled to the cord reel mechanism subsequent to assembly of the power cord thereto and which readily can be replaced, in case of wear, without disassembling the cord reel.

Having in mind the above and other objects that will be evident from an understanding of the disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it when read in conjunction with the accompanying drawings in which:

DESCRIPTION OF THE PREFERRED EMBODIMENT

Figure 1:
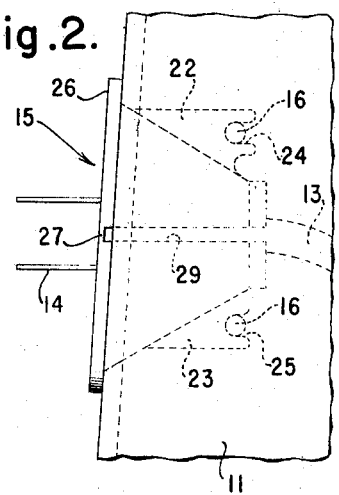
FIG. 1 illustrates a front view of an upright vacuum cleaner, showing the cord exit device mounted on the left side of the handle support cover.

Referring more specifically to the drawings, wherein similar parts are denoted by the same reference numeral, there is disclosed in FIG. 1 a conventional upright vacuum cleaner generally referred to by the reference numeral 10, such as the Singer Model U-43 Cleaner, having a front handle support cover or housing 11 which carries a standard cord reel or cord retractor mechanism 12 at the base of the handle assembly. It is to be understood that the location of the cord reel 12 is not limited to the handle support cover as shown in the accompanying drawings, but may be located wherever deemed desirable on the cleaner to those skilled in the art. The cord reel 12 has a power cord 13 operatively associated therewith either for withdrawal from the reel when operating the cleaner or for keeping in a substantially concealed or stored retracted position as shown in FIG. 1. The cord conventionally is attached at one end to the cord reel and at the other free end carries a standard type of cord plug 14.

Figure 2:
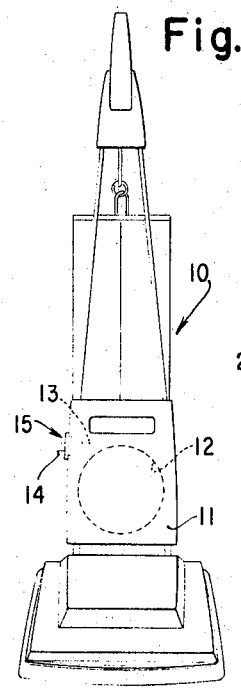
FIG. 2 illustrates an enlarged fragmentary view of the front handle support cover, showing the mounted cord exit device.

A cord exit generally designated 15 mounted in a recess (not shown) formed in the side of the front handle support cover 11 prevents complete retraction of the power cord inside the support cover in a manner to be fully described hereinafter. The cord exit 15 preferably is shown in FIG. 1 as being mounted on the left side of the front handle housing 11 disposed in a recess (not shown) formed in a side wall of that housing. A rear handle support cover (not shown) forms the back wall of the front housing. It is to be understood that the location of the cord exit is not limited to the front housing or to the left side as shown in the drawings. Preferably, a pair of threaded raised surface portions (not shown) disposed on the inside surface of the front cover 11 mount the cord exit by means of a pair of standard fastening screws 16 shown in FIG. 2.

The cord exit 15 includes a main body portion 17 of substantially frusto-pyramidical or frusto-conical shape comprising a pair of converging end walls 18, 19 and a pair of partially split converging side walls 20, 21. A pair of lateral protruding projections 22 and 23 integrally formed with the end walls 18 and 19 of the cord exit body portion 17, respectively, have open-ended mounting slots 24 and 25 formed therein for receiving the screws 16 and securing the cord exit in place in the support cover 11.

Figure 9:
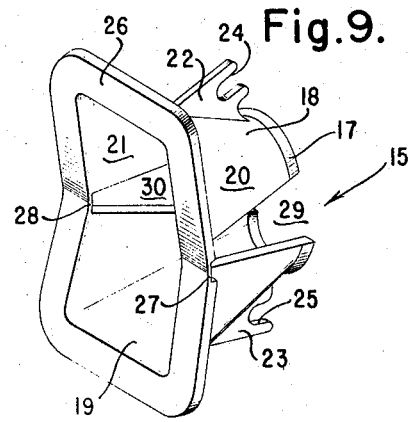
FIG. 9 illustrates a perspective view of the cord exit device in its normal expanded position.
Figure 3:
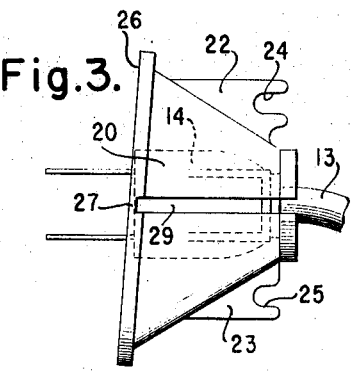
FIG. 3 illustrates an elevational view of the cord exit device of FIG. 2 in its mounted or non-expanded position with the plug end of the power cord disposed therein.
Figure 4:
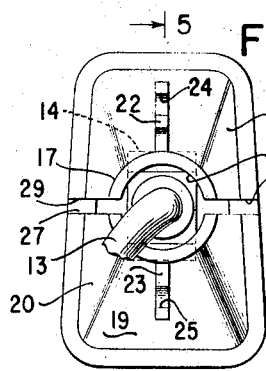
FIG. 4 illustrates a rear view of the cord exit device shown in FIG. 3.
Figure 5:
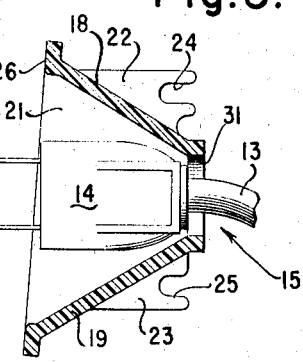
FIG. 5 illustrates a sectional view substantially taken on the line 5—5 of FIG. 4.

As best shown in FIG. 9, one end of the cord exit comprises a bendable trapezoidal-shaped rim 26 which extends beyond the periphery of the adjoining portion of the main body 17 to form a shelf-like region which abuts the outer surface of the side wall of the front housing 11 for properly positioning the cord exit in the mounting recess formed therein. The rim 26 is formed with a pair of opposing thinned portions 27 and 28 to provide the rim with a certain degree of flexibility in these areas. Each of the side walls 20 and 21 of the cord exit is formed with an open-ended split as shown at 29 and 30. As best shown in FIG. 9, the splits 29 and 30 are open-ended at one end thereof and at the other end are closed by the adjacent thinned out portions 27 and 28 of the rim 26.

When the cord exit 15 is mounted to the housing it will appear as shown in FIGS. 2–5 inclusive, that is, with the end disposed inside the handle housing forming a circular-shaped opening, as at 31, whose diameter is greater than the dimensions of the lower end of the plug 14 to prevent retraction of the plug end through the opening. This latter relationship between the plug end 14 and the circular-shaped opening 31 is illustrated clearly in FIGS. 3, 4 and 5. As shown in these latter figures, the opening 31 is closed sufficiently when the cord exit is mounted to the housing to form a means for preventing further retraction of the plug. Thus, in its stored position the plug 14 is disposed adjacent the lower inner surface of the cord exit 15. The rim 26, which abuts the sidewalls defining the recess in the housing 11, prevents the cord exit from being drawn through the recess since its overall dimensions are greater than those of the recess.

Figure 7:
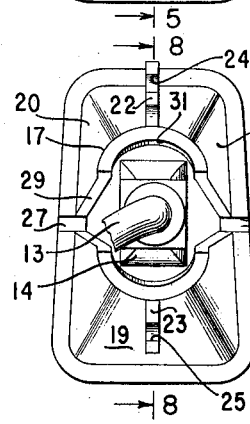
FIG. 7 illustrates a rear view of the cord exit device shown in FIG. 6.
Figure 8:
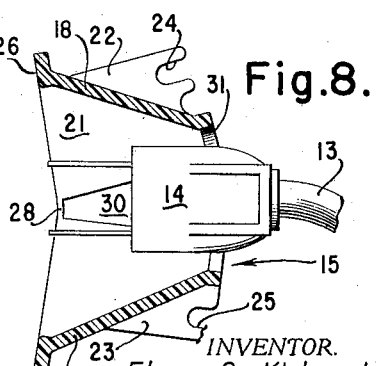
FIG. 8 illustrates a sectional view substantially taken on the line 8—8 of FIG. 7.

Heretofore, the cord exit had to be pre-assembled to the power cord before the cord could be assembled to the cord reel mechanism, since only the end of the cord opposite the plug end was of sufficiently small size to freely pass through the smaller of the two openings formed in the cord exit. However, with the present invention the above prior art deficiency is obviated since the smaller opening 31 of the cord exit 15 can be expanded (see FIGS. 6–8) to fit over the plug end 14 of the power cord after the opposite end of the cord has been assembled to the cord reel. This arrangement is illustrated clearly in FIGS. 6, 7 and 8 wherein the plug end 14 is shown freely passing through the expanded cord exit opening 31.

Figure 6:
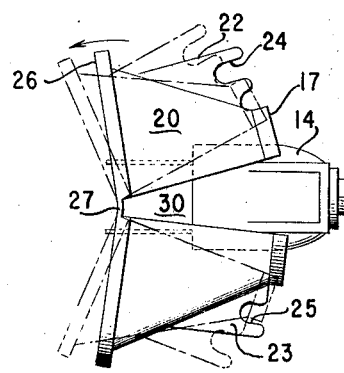
FIG. 6 illustrates an elevational view of the cord exit device in a plurality of unmounted expanded positions with the plug end of the power cord partially drawn therethrough.

When the cord exit 15 is detached from the housing 11, it will appear substantially as shown in FIG. 9 and also substantially as shown by the solid lines in FIG. 6. In order to allow the plug end 14 freely to pass through the cord exit either for purposes of assembly or when it is desired to replace the cord exit because of wear or damage, the halves of the main body portion 17 further may be expanded in the direction shown by the arrows in FIG. 6 about an axis passing through the flexible portions 27 and 28 to the position shown by the broken line in FIG. 6. The thickness of the thinned out portions 26 and 27 is such as to withstand repeated stress exerted thereon by the bending motion of the cord exit rim and particularly so when it is expanded to the position shown in FIG. 6.

These figures clearly illustrated that to replace the cord exit 15 one merely need unscrew the fastening screws 16, expand the opening 31 to pass freely over the plug end

14 and mount the new cord exit to the housing. Thus, a relatively simple but novel cord exit has been provided.

Numerous alterations of the structure herein disclosed will suggest themselves to those skilled in the art. However, it is to be understood that the present disclosure relates to a preferred embodiment of my invention which is for purposes of illustration only and not to be construed as a limitation of the invention.

Having thus set forth the nature of this invention what I claim is:

1. A unitary cord exit device for permitting free axial movement therethrough of a power cord carrying a plug at its free end, said device comprising a hollow body having a first end and a second end and being defined by a plurality of integrally formed gradually converging relatively thin walls constructed and arranged to form an open-ended plug receiving pocket, said hollow body having at said first end a first normally enlarged opening of a size sufficient to pass the plug end of the power cord and having at said second end a second extendable opening, hinge means formed adjacent said first opening for enabling variation in the size of at least said second opening such that the plug end is capable of freely passing therethrough, said main body including at least one split for effectively separating the main body into two sections relatively movable in opposite directions about said hinge means.

2. In an electric floor appliance including a housing for mounting a cord retractor which retractably carries a power cord secured thereto at one end and having a plug connector formed at the opposite end disposed in cooperative relationship with cord guiding and limiting means, said means comprising an open-ended frusto-conically shaped body having a pair of relatively movable members, one end of said body being formed with hinge means for enabling relative movement of said members, means formed on at least one of said members for removably mounting said cord guiding and limiting means to said housing, said means including an opening formed at each end of said body, the opening at said one end being of a size sufficient to receive the plug end of said power cord, and the other opening at the opposite end of said body when in its mounted position on said housing being of a size sufficient to prevent passage of the plug end therethrough, and said cord guiding and limiting means being constructed such that when said means is detached from said housing said other opening is capable of being expanded to a size which allows said plug end freely to pass therethrough.

3. In an electric floor appliance as defined in claim 2 wherein said frustoconically shaped body includes at least one partially split wall for separating said body into said pair of relatively movable members.

4. In an electric appliance having a housing for mounting a cord retractor with a power cord including a free plug end, a cord guiding and limiting device comprising:
(a) a unitary hollow molded member adapted to be mounted on said housing in cooperative relationship with said power cord,
(b) said member having gradually converging relatively thin walls constructed and arranged to form an opening at each end thereof,
(c) one end of said member including an extended rim having at least one bendable reduced portion formed therewith, said rim connecting said walls at said one end to form a relatively large opening of a size sufficient to receive the plug end of the power cord,
(d) at least one of said walls having an open-ended split formed adjacent said reduced portion of said rim, whereby said member effectively comprises two sections adapted for bending movement about said reduced portion,
(e) means integrally formed on said member for operably mounting said member to said housing thereby to prevent relative movement of said sections, (f) the other end of said member when mounted to said housing comprising a relatively small opening of such size as to permit free passage of the cord therethrough while simultaneously preventing passage of the plug end when the cord is in its retracted position, said opening being adapted to be enlarged upon detachment of said member from said housing to a size sufficient to permit said plug end to pass therethrough.

5. A unitary hollow molded device adapted to be mounted on a housing in cooperative relationship with a power cord having a free plug end, said device comprising a frustoconical shaped main body having relatively thin walls constructed and arranged to form a pocket adapted for receiving the plug end of the cord and formed at each end with a different size opening, a laterally extending rim including hinge means provided at one end of said main body for connecting said walls at said one end to form a relatively large opening of a size sufficient to permit passage of the plug end therethrough, an open-ended split formed in at least one of said walls terminating adjacent said hinge means, whereby said main body comprises two sections adapted for bending movement about said hinge means, means formed on said main body portion adapted for mounting said device to said housing such that the opening formed at the end of said main body opposite said one end is of a size to permit free passage of the cord therethrough while simultaneously preventing passage of the plug end.

References Cited

UNITED STATES PATENTS

| 3,197,556 | 7/1965 | Simon | 248—56 X |
| 3,288,407 | 11/1966 | Downer et al. | |
| 3,085,279 | 4/1963 | Meyerhoeter | 15—323 |
| 3,394,904 | 7/1968 | Meyerhoeter | 15—3.23 X |

ROBERT M. MICHELL, Primary Examiner

U.S. Cl. X.R.

174—135